March 27, 1956  B. W. ROBERTS  2,740,087
GENERATOR CONTROL APPARATUS
Filed Jan. 10, 1955
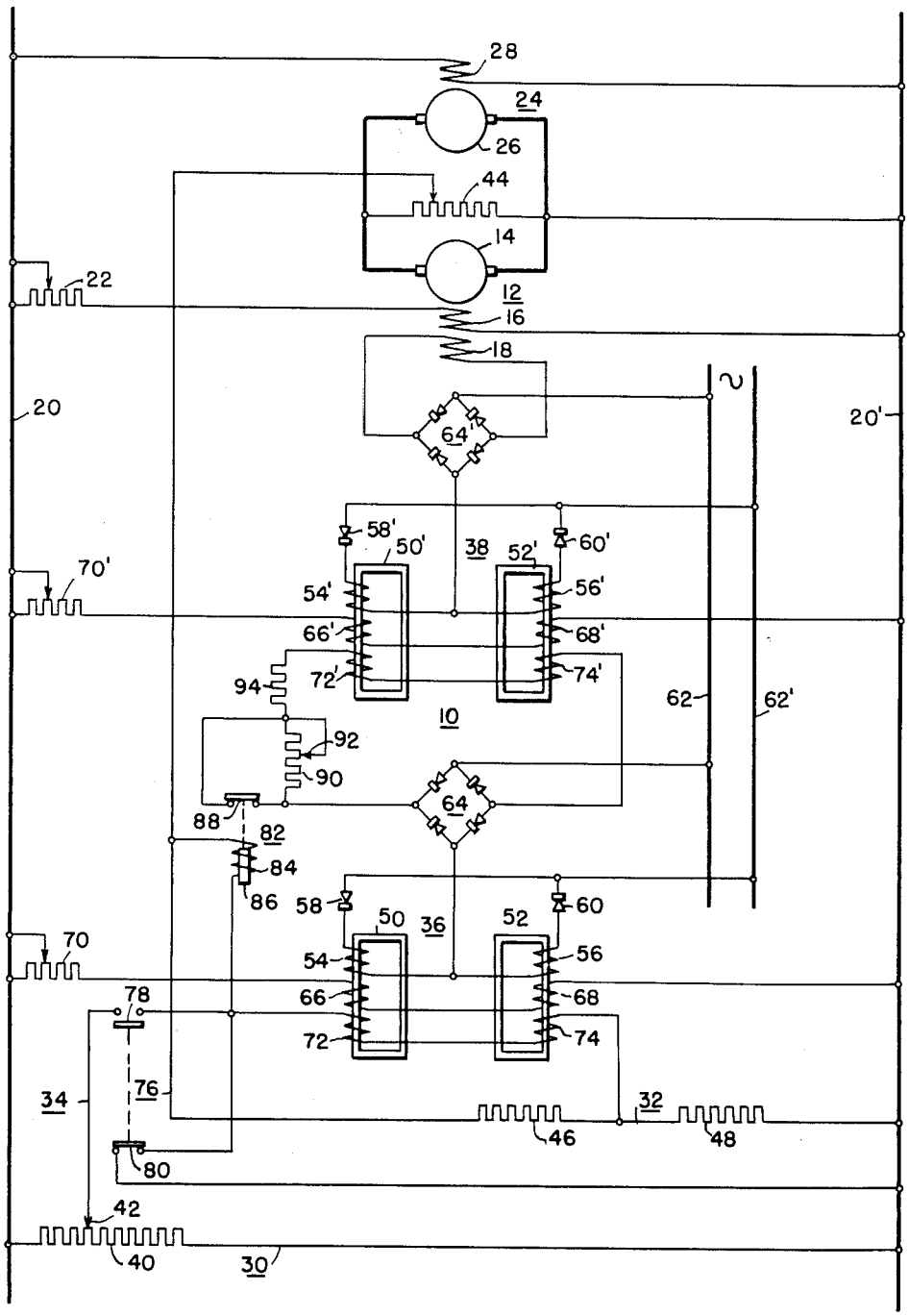
WITNESSES:
E. A. McCloskey
D. H. Thomas
INVENTOR
Billy W. Roberts.
BY
Ezra W. Savage
ATTORNEY

United States Patent Office 2,740,087
Patented Mar. 27, 1956

2,740,087

GENERATOR CONTROL APPARATUS

Billy W. Roberts, Buffalo, N. Y., assignor to Westinghouse Electric Corporation, East Pittsburgh, Pa., a corporation of Pennsylvania Application January 10, 1955, Serial No. 480,647

5 Claims. (Cl. 322—36)

This invention relates to electrical control apparatus and more particularly to control apparatus for limiting the magnitude of the forcing voltage applied to a generator.

When starting up a generator which supplies energy to a motor, it is often times necessary to limit the rate at which the generator voltage builds up in order to prevent a flashover of the motor. The reason for this is that if the generator voltage builds up too rapidly the motor is unable to accelerate fast enough to handle this rapid increase in generator voltage, and thus, a flashover of the motor results. Also, if the motor is much larger than the generator then too rapid an increase in the generator voltage causes the generator itself to flashover.

The rate of change of generator voltage is determined by the magnitude of the forcing voltage applied to the generator field. The magnitude of the forcing voltage in turn is determined by the forcing factor which is the ratio between the maximum voltage applied to the generator field and the magnitude of that voltage which is under normal regulating conditions applied to the generator field. Thus, by limiting the magnitude of the voltage that can be applied to the generator field on starting the generator, damage to either the generator or motor can be prevented.

An object of this invention is to provide for limiting the magnitude of the forcing voltage applied to a generator field to thereby prevent either a flashover of the generator or a flashover of a motor supplied therefrom.

A specific object of this invention is to provide for producing a control effect on a generator field until an error signal, determined by the difference between a reference voltage and a measure of the output voltage of the generator, decreases on starting up the apparatus to a predetermined value, to thereby limit the magnitude of the forcing voltage applied to the generator field and thus prevent either a flashover of the generator or a flashover of a motor supplied therefrom.

A more specific object of this invention is to provide for limiting the magnitude of the forcing voltage applied to a generator field, by rendering a relay responsive to an error signal, determined by the difference between a reference voltage and a measure of the output voltage of the generator, so that the relay effects an increase in the impedance of a control circuit, controlling the magnitude of the forcing voltage, until the error signal on starting up the apparatus decreases to a predetermined value.

Other objects of this invention will become apparent from the following description when taken in conjunction with the accompanying drawing in which the single figure is a schematic diagram illustrating this invention.

Referring to the drawing, this invention is illustrated by reference to a regulator system 10 for maintaining the output voltage of a direct-current generator 12 substantially constant. In this instance, the generator 12 comprises an armature 14, a differential field winding 16, and a main shunt field winding 18. The function of the differential field winding 16 is to buck-out the residual magnetism of the generator 12. As illustrated, the differential field winding is connected to be energized from conductors 20 and 20' which have applied thereto a substantially constant direct-current voltage. An adjustable resistor 22 is connected in series circuit relationship with the differential field winding 16 so that the magnitude of the current flow through the differential field winding 16 can be varied.

A direct-current motor 24, having an armature 26 and a field winding 28, is connected to be energized from the direct-current generator 12. As illustrated, the field winding 28 of the direct-current motor 24 is also connected to be energized from the conductors 20 and 20'. Since the regulator system 10 maintains the output voltage of the direct-current generator 12 substantially constant the speed of the direct-current motor 24 is likewise maintained substantially constant.

In general, the regulator system 10 comprises circuit means 30 for producing a substantially constant direct-current reference voltage, circuit means 32 for obtaining a measure of the direct-current output voltage of the generator 12, circuit means 34 for obtaining a direct-current error voltage which is a measure of the difference between the reference voltage and the measure of the output voltage of the generator 12, a first stage magnetic amplifier or electromagnetic device 36 which is responsive to the error voltage, and a second stage magnetic amplifier or electromagnetic device 38 which is responsive to the output of the magnetic amplifier 36 and which is connected to control the magnitude of the voltage across the main shunt field winding 18 of the generator 12.

Specifically, the circuit means 30 for producing a direct-current reference voltage comprises a resistor 40 having a movable contact member 42. In this instance, the resistor 40 is connected between the conductors 20 and 20' so as to have applied thereto a substantially constant direct-current voltage. The reference voltage appears between the conductor 20' and the movable contact 42 of the resistor 40.

The circuit means 32 for obtaining a measure of the direct-current output voltage of the generator 12 comprises an adjustable resistor 44 which is connected across the armature 14 of the generator 12, and resistors 46 and 48 which are connected in series circuit relationship with one another, the series circuit being connected across a portion of the adjustable resistor 44. Thus, a direct-current voltage appears across the resistor 48 which is a measure of the output voltage of the generator.

In this instance, the magnetic amplifier 36 is a full-wave doubler-type self-saturating magnetic amplifier. The magnetic amplifier 36 comprises two magnetic core members 50 and 52 which have disposed in inductive relationship therewith load windings 54 and 56, respectively. In order to produce self-saturation for the magnetic amplifier 36, self-saturating rectifiers 58 and 60 are connected in series circuit relationship with the load windings 54 and 56, respectively. Energy for the load windings 54 and 56 is received from conductors 62 and 62' which have applied thereto a suitable alternating-current voltage. A full-wave dry-type rectifier 64 is so interconnected with the load windings 54 and 56 and with the conductors 62 and 62' as to produce at its output a direct-current voltage which represents the output voltage of the magnetic amplifier 36.

Bias windings 66 and 68 are disposed in inductive relationship with the magnetic core members 50 and 52, respectively. The bias windings 66 and 68 are connected in series circuit relationship with one another and in series circuit relationship with an adjustable resistor 70, the series circuit being connected between the conductors 20 and 20'. The function of the adjustable resistor 70 is to enable the magnitude of the current flow through the bias windings 66 and 68 to be varied. In operation, the current flow through the bias windings 66 and 68 produces magnetomotive forces that oppose the magnetomotive forces produced by the current flow through the load windings 54 and 56, respectively. Thus the bias windings 66 and 68 function to bias the magnetic core members 50 and 52, respectively, a predetermined amount away from saturation.

In order to control the output voltage of the magnetic amplifier 36 in accordance with the magnitude of the direct-current error voltage obtained by the circuit means 34, control windings 72 and 74 are disposed in inductive relationship with the magnetic core members 50 and 52, respectively. In this instance the control windings 72 and 74 are connected in series circuit relationship with one another, the series circuit being connected by means of the circuit means 34 to the junction point of the resistors 46 and 48 and to the movable contact 42 of the resistor 40 when a relay 76 having contact members 78 and 80, is so positioned that its contact members 78 are in the circuit closed position. The function of the relay 78 is to provide either a reference voltage of zero magnitude or a reference voltage of predetermined magnitude as determined by the position of the movable contact 42 of the resistor 40. When a reference voltage of predetermined magnitude is provided, the contact members 78 are in the circuit closed position and the contact members 80 are in the circuit open position. On the other hand, when a reference voltage of zero magnitude is provided the contact members 78 and 80 are positioned as shown in the drawing.

Since the second stage magnetic amplifier 38 is similar to the first stage magnetic amplifier 36 like components of the magnetic amplifiers 36 and 38 have been given the same reference characters, however, the reference characters with respect to the magnetic amplifier 38 have been primed.

In accordance with the teachings of this invention, switching means, specifically a relay 82, is controlled in accordance with the direct-current error voltage appearing between the movable contact 42 and the junction point of the resistors 46 and 48, the relay 82 being connected to control the magnitude of the output voltage of the magnetic amplifier 38. In this instance, the relay 82 comprises an operating coil 84, an armature 86, and contact members 88. As illustrated, the operating coil 84 of the relay 82 is connected in series circuit relationship with the resistor 46, the series circuit being connected between the movable contact 42 and the resistor 40 and the junction point of the resistors 46 and 48. Thus, the relay 82 is responsive to the magnitude of the direct-current error voltage appearing between these two points.

In practice, the relay 82 is set so that when the direct-current error voltage is above a predetermined magnitude the relay 82 is picked up, that is, its contact members 88 are in the open circuit position. When the direct-current error voltage decreases to the predetermined magnitude of error voltage the relay 82 drops out and its contact members 88 return to the closed circuit position.

In order to vary the magnitude of the current flow through the control windings 72' and 74' of the magnetic amplifier 38 in accordance with the operation of the relay 82 an adjustable resistor 90, having a movable contact 92, is provided. The adjustable resistor 90 is connected in series circuit relationship with a current-limiting resistor 94 and in series circuit relationship with the control windings 72' and 74'. In operation, the series circuit, including the resistors 90 and 94, and the control windings 72' and 74', is responsive to the output voltage of the magnetic amplifier 36, and thus is responsive to the magnitude of the direct-current error voltage appearing between the movable contact 42 and the junction point of the resistors 46 and 48. Thus, by shorting out the adjustable resistor 90 the magnitude of the output voltage of the magnetic amplifier 38 can be changed. This is the function of the relay 82. In particular, the relay 82 effects a shunt circuit around the adjustable resistor 90 when the direct-current error voltage decreases to below a predetermined value. In other words, as long as the direct-current error voltage appearing between the movable contact 42 and the junction point of the resistors 46 and 48, is above the predetermined value, the relay 82 is picked up and the adjustable resistor 90 is connected in circuit operating relationship with respect to the control windings 72' and 74', of the magnetic amplifier 38, so as to effect a decrease in the magnitude of the output voltage of the magnetic amplifier 38, to thus limit the magnitude of the forcing voltage applied to the main shunt field winding 18 of the generator 12.

The operation of the apparatus shown in the drawing will now be described. However, before putting the apparatus into operation the relay 76 should be positioned so that its contact members 78 are in the circuit closed position. When first starting up the generator 12, the magnitude of the output voltage of the generator 12 is at a minimum. Therefore, the magnitude of the reference voltage, appearing between the movable contact 42 and the conductor 20' is much greater than the measure of the output voltage of the generator 12 appearing across the resistor 48. Such being the case, the relay 82 is picked up thus opening up the shunt circuit around the adjustable resistor 90. This decreases the magnitude of the current flow through the control windings 72' and 74' of the magnetic amplifier 38 which in turn increases the impedance of the load windings 54' and 56'. An increase in the impedance of the load windings 54' and 56' effects a decrease in the output voltage of the magnetic amplifier 38, and thus a decrease in the magnitude of the forcing voltage applied to the main shunt field winding 18 of the generator 12. Thus, when the direct-current error voltage, appearing between the movable contact 42 and the junction point of the resistors 46 and 48, is above a predetermined value, the forcing voltage applied to the main shunt field winding is limited.

When the direct-current error voltage, appearing between the movable contact 42 and the junction point of the resistors 46 and 48, decreases to a value below the predetermined value, the relay 82 drops out effecting a shunt circuit around the adjustable resistor 90. Such an action increases the magnitude of the current flow through the control windings 72' and 74' of the magnetic amplifier 38 as compared to when the relay was picked up, to thereby obtain under normal regulating conditions a maximum gain for the magnetic amplifiers 36 and 38. Since the normal regulating operation of the regulator system 10 is well known to those skilled in the art, a description of such operation is deemed unnecessary.

The setting of the adjustable resistor 90 determines the magnitude of the forcing voltage that is applied to the main shunt field winding 18 of the generator 12. Thus, by inserting more of the resistor 90 in series circuit relationship with the control windings 72' and 74' of the magnetic amplifier 38, the forcing voltage applied to the main shunt field winding 18 can be further limited.

It is to be understood that the apparatus embodying this invention not only effects a limiting of the forcing voltage applied to the field winding 18 of the generator 12 when it is first started up, but also performs the function of limiting the forcing voltage applied to the main shunt field winding 18 of the generator 12 when the magnitude of the reference voltage is manually changed to a higher value.

The apparatus embodying the teaching of this invention has several advantages. For instance, the apparatus provides a means of controlling the rate of change of generator voltage without the use of a motor operated rheostat or current limit control. In addition, magnetic amplifier power requirements are small and with the adjustable resistor 90 positioned as shown in the drawing a minimum of power loss is produced by current flow through the resistor 90. Further, the rate of change of generator voltage may be varied over a range of 4 to 1, depending upon the construction of the apparatus, by merely setting the adjustable resistor 90.

Since certain changes may be made in the above apparatus and circuits and different embodiments of the inventon could be made without departing from the scope thereof, it is intended that all matter contained in the above description or shown in the accompanying drawing shall be interpreted as illustrative and not in a limiting sense.

I claim as my invention:

1. In control apparatus for limiting the forcing voltage applied to a field winding of a generator, the combination comprising, means for producing a reference voltage, circuit means for obtaining a measure of the output voltage of the generator, means for obtaining an error signal which is a measure of the difference between the reference voltage and said measure of the output voltage of the generator, an electromagnetic device controlled in accordance with the magnitude of said error signal and having an output connected to control the magnitude of the voltage across the field winding of the generator, and switching means controlled in accordance with the said error signal and connected to control the magnitude of the output of the electromagnetic device, the switching means being such as to effect a switching operation when the said error signal is above a predetermined value on starting up the generator, to thus limit the magnitude of the output of the electromagnetic device until the said error signal decreases to said predetermined value.

2. In control apparatus for limiting the forcing voltage applied to a field winding of a generator, the combination comprising, means for producing a reference voltage, circuit means for obtaining a measure of the output voltage of the generator, means for obtaining an error signal which is a measure of the difference between the reference voltage and said measure of the output voltage of the generator, an electromagnetic device controlled in accordance with the magnitude of said error signal and having an output connected to control the magnitude of the voltage across the field winding of the generator, an impedance member connected to control the magnitude of the output of the electromagnetic device, and a relay controlled in accordance with the said error signal and connected to effect a shunt circuit around the impedance member when the said error signal decreases to a predetermined value on starting up the generator, to thus limit the magnitude of the output of the electromagnetic device while the said error signal is above said predetermined value.

3. In control apparatus for limiting the forcing voltage applied to a field winding of a generator, the combination comprising, means for producing a reference voltage, circuit means for obtaining a measure of the output voltage of the generator, means for obtaining an error signal which is a measure of the difference between the reference voltage and said measure of the output voltage of the generator, an electromagnetic device having an output and a control winding, the output of the electromagnetic device being connected to control the magnitude of the voltage across the field winding of the generator, an impedance member, the impedance member being connected in series circuit relationship with said control winding, other circuit means for rendering said series circuit responsive to said error signal, and a relay controlled in accordance with the said error signal and connected to effect a shunt circuit around the impedance member when the said error signal decreases to a predetermined value on starting up the generator, to thus limit the magnitude of the output of the electromagnetic device while the said error signal is above said predetermined value.

4. In control apparatus for limiting the forcing voltage applied to a field winding of a generator supplying energy to a motor, the combination comprising, means for producing a reference voltage, circuit means for obtaining a measure of the output voltage of the generator, means for obtaining an error signal which is a measure of the difference between the reference voltage and said measure of the output voltage of the generator, a magnetic amplifier having an output and a control winding, the output of the magnetic amplifier being connected to control the magnitude of the voltage across the field winding of the generator, an adjustable resistor, the adjustable resistor being connected in series circuit relationship with said control winding, other circuit means for rendering said series circuit responsive to said error signal, and a relay controlled in accordance with the said error signal to effect a shunt circuit around the adjustable resistor when the said error signal decreases to a predetermined value on starting up the generator, to thus limit the magnitude of the output of the magnetic amplifier while the said error signal is above said predetermined value.

5. In control apparatus for limiting the forcing voltage applied to a field winding of a generator supplying energy to a motor, the combination comprising, means for producing a reference voltage, circuit means for obtaining a measure of the output voltage of the generator, means for obtaining an error signal which is a measure of the difference between the reference voltage and said measure of the output voltage of the generator, a magnetic amplifier having an output and a control winding, the control winding being connected to be responsive to said error signal, another magnetic amplifier having an output and a control winding, the output of said another magnetic amplifier being connected to control the magnitude of the voltage across the field winding of the generator, an adjustable resistor, the adjustable resistor being connected in series circuit relationship with the control winding of the said another magnetic amplifier, other circuit means for rendering said series circuit responsive to the output of the first mentioned magnetic amplifier, and a relay controlled in accordance with the said error signal to effect a shunt circuit around the adjustable resistor when the said error signal decreases to a predetermined value on starting up the generator, to thus limit the magnitude of the output of the said another magnetic amplifier while the said error signal is above said predetermined value.

No references cited.